(12) United States Patent
Takeuchi et al.

(10) Patent No.: US 7,731,877 B2
(45) Date of Patent: Jun. 8, 2010

(54) METHOD AND DEVICE FOR FEEDING MOLTEN RESIN, AND METHOD FOR MANUFACTURING MOLDED ARTICLE BY USING THE FED MOLTEN RESIN

(75) Inventors: Kimio Takeuchi, Kanagawa (JP); Takahiro Kurosawa, Kanagawa (JP); Kentaro Ichikawa, Kanagawa (JP); Norihisa Hirota, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 240 days.

(21) Appl. No.: 11/814,453

(22) PCT Filed: Jan. 19, 2006

(86) PCT No.: PCT/JP2006/300697

§ 371 (c)(1),
(2), (4) Date: Jul. 20, 2007

(87) PCT Pub. No.: WO2006/077908

PCT Pub. Date: Jul. 27, 2006

(65) Prior Publication Data

US 2009/0020903 A1 Jan. 22, 2009

(30) Foreign Application Priority Data

Jan. 21, 2005 (JP) .............................. 2005-014779

(51) Int. Cl.
*B29C 47/00* (2006.01)
(52) U.S. Cl. ..................... 264/148; 264/319; 425/258
(58) Field of Classification Search ................. 264/148, 264/319; 425/258
See application file for complete search history.

(56) References Cited

U.S. PATENT DOCUMENTS 3,307,224 A * 3/1967 Hofer et al. ................. 425/552

(Continued)

FOREIGN PATENT DOCUMENTS

JP 2-503176 A 10/1990

(Continued)

OTHER PUBLICATIONS

International Search Report of PCT/JP2006/300697, date of mailing Apr. 18, 2006.

(Continued)

*Primary Examiner*—Joseph S Del Sole
*Assistant Examiner*—David N Brown, II
(74) *Attorney, Agent, or Firm*—Westerman, Hattori, Daniels & Adrian, LLP

(57) ABSTRACT

A method and a device for feeding a molten resin capable of accurately feeding the molten resin without the delay of feed timing by preventing the molten resin from adhering to route members before it seats on a mold to increase the positioning accuracy of the molten metal in the mold, and a method of manufacturing a molded part by using the fed molten resin. Vibration is provided to the route members such as molten resin guide pins (10, 40, 50), throat members (62, 70, 85), and female mold positioned in a route in which the molten resin (25) passes before it seats on the female mold (7, 63) by a vibration imparting device (27) or a gas layer film is formed on the surfaces thereof. Thus, the molten resin can be fed while preventing it from adhering to the route members.

13 Claims, 13 Drawing Sheets

U.S. PATENT DOCUMENTS

| | | | |
|---|---|---|---|
| 3,398,427 A * | 8/1968 | John | 425/149 |
| 4,025,268 A * | 5/1977 | Taylor | 425/547 |
| 4,913,871 A * | 4/1990 | Kawaguchi et al. | 264/294 |
| 5,538,413 A * | 7/1996 | Gardner et al. | 425/145 |
| 5,653,534 A * | 8/1997 | Matsumoto et al. | 366/76.1 |
| 5,705,201 A * | 1/1998 | Ibar | 425/130 |
| 5,885,495 A * | 3/1999 | Ibar | 264/69 |
| 6,045,736 A | 4/2000 | Hanot et al. | |
| 2009/0020903 A1* | 1/2009 | Takeuchi et al. | 264/148 |

FOREIGN PATENT DOCUMENTS

| | | |
|---|---|---|
| JP | 3-227208 A | 10/1991 |
| JP | 6-198665 A | 7/1994 |
| JP | 7-61656 B2 | 7/1995 |
| JP | 10-500073 A | 1/1998 |
| JP | 2000-280248 A | 10/2000 |
| JP | 2003-165133 A | 6/2003 |
| JP | 2004-314336 A | 11/2004 |
| WO | 89/07516 A1 | 8/1989 |
| WO | 95/31320 A1 | 11/1995 |

OTHER PUBLICATIONS

International Search Report on Patentability PCT/JP2006/300697 mailed on Aug. 2, 2007.

* cited by examiner

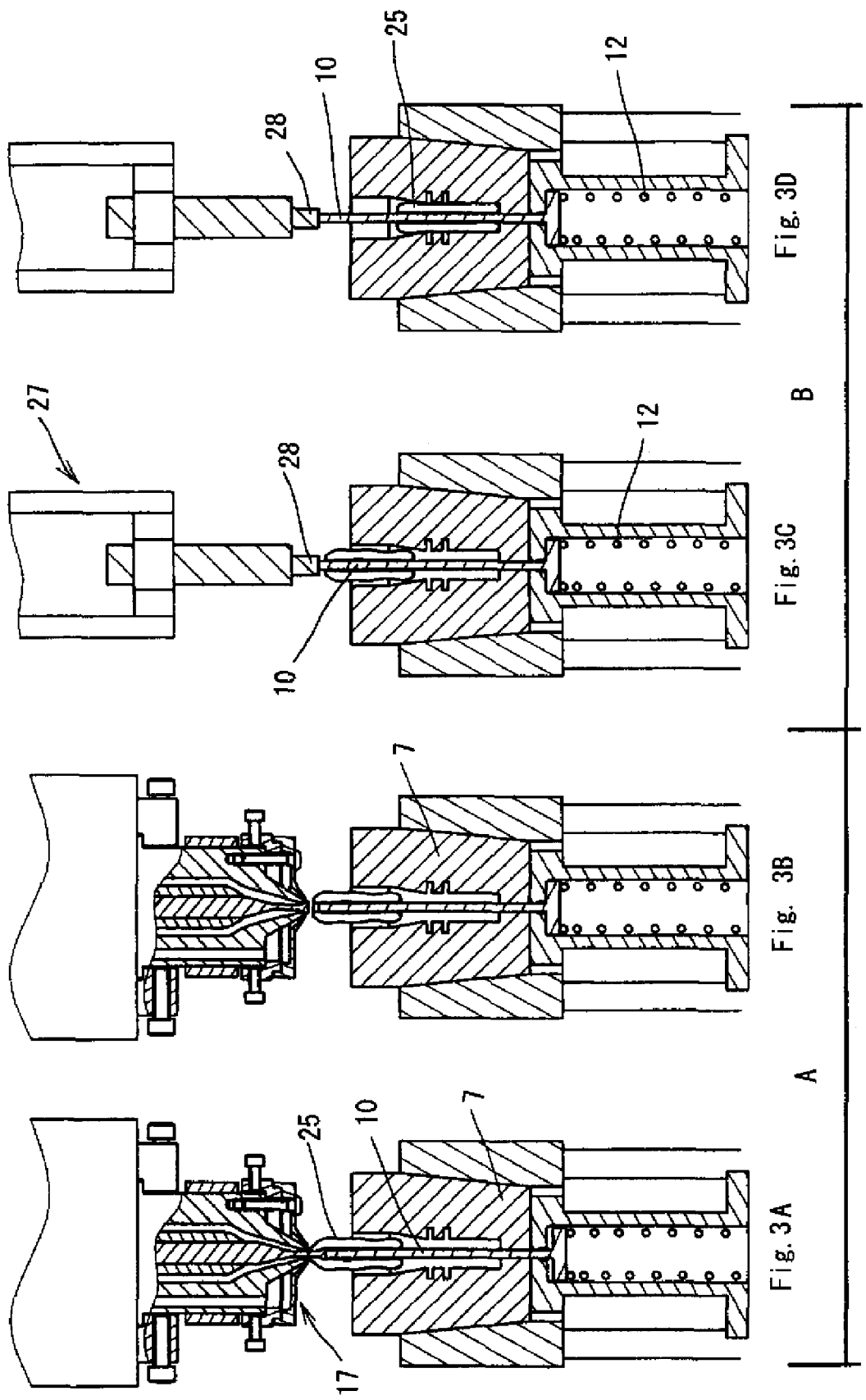

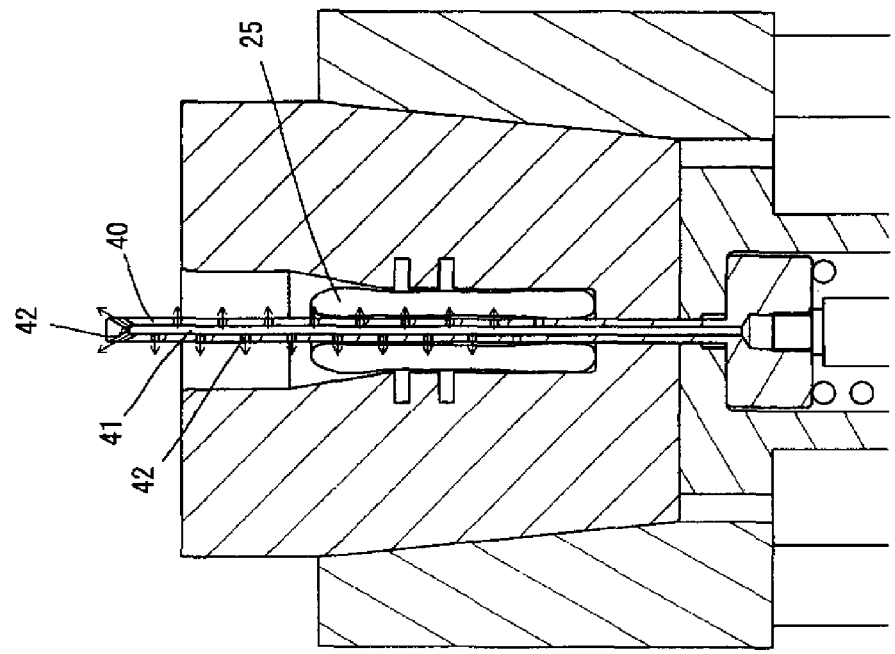
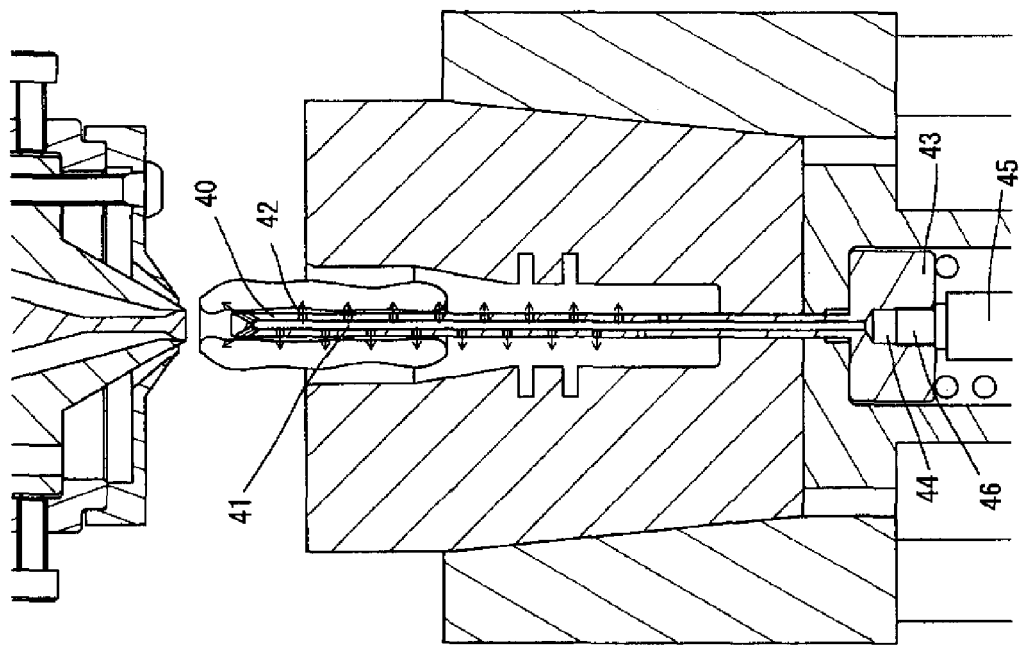

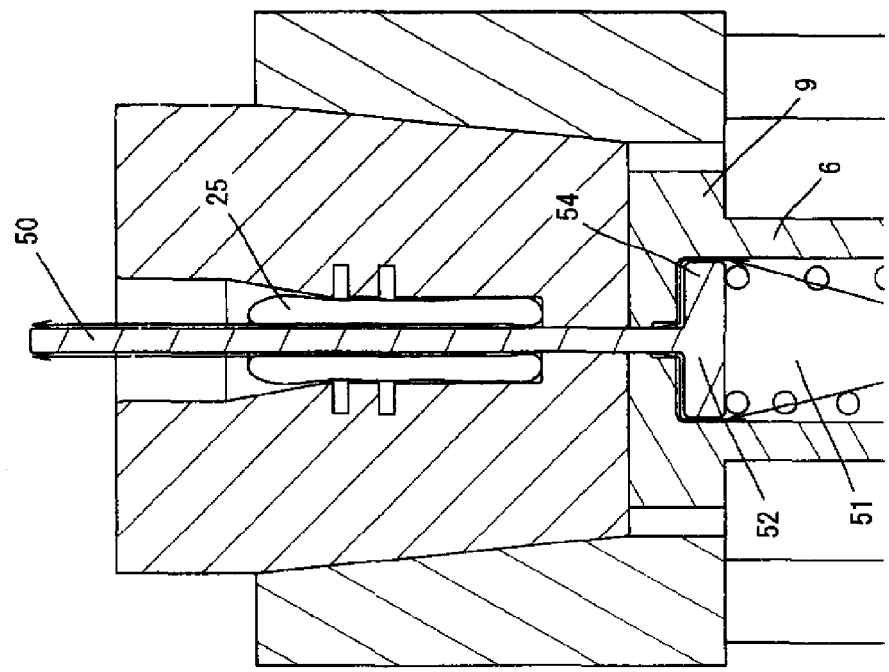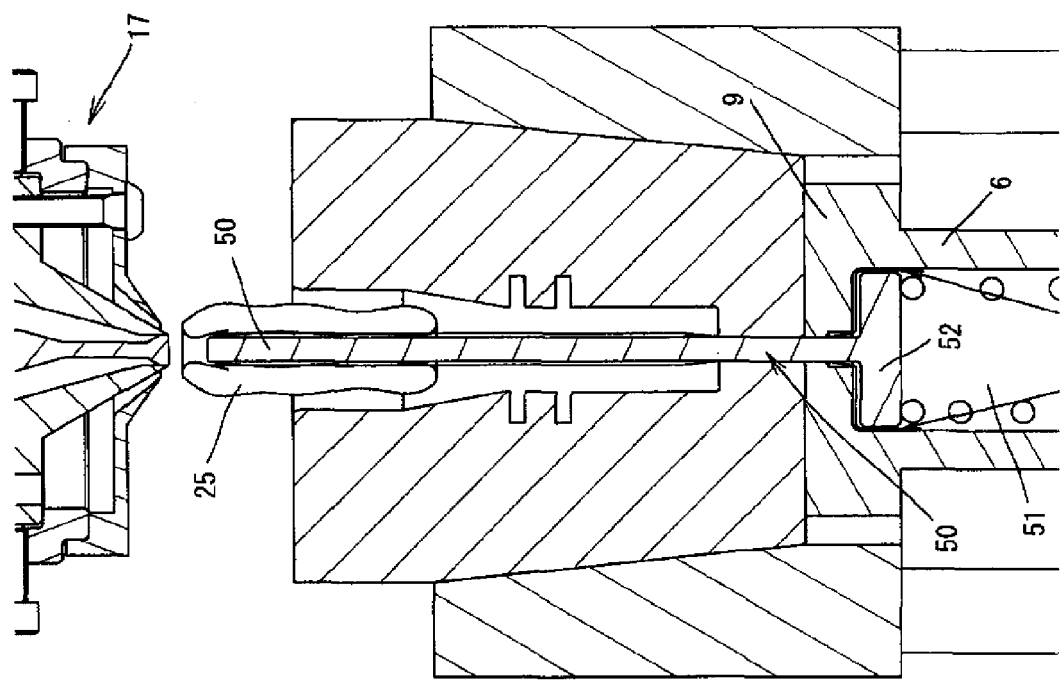

DIAMETER OF MOLTEN RESIN

PASSAGE TIME

METHOD AND DEVICE FOR FEEDING MOLTEN RESIN, AND METHOD FOR MANUFACTURING MOLDED ARTICLE BY USING THE FED MOLTEN RESIN

TECHNICAL FIELD

The present invention relates to a method for feeding a molten resin to a molding apparatus that molds the molten resin, for example, when a molten resin extruded from a die head is fed to a mold and compression molded, and to a device for such feeding, and also to a method for manufacturing a molded article by using the fed molten resin.

BACKGROUND ART

A process in which a molten resin mass (referred to hereinbelow simply as "molten resin") extruded from a die head of an extruder is fed to a mold and compression molded to the predetermined shape with a female mold and a male mold has been widely used in the past. For example, in the field of containers, the molten resin extruded from a die head is compression molded in a mold as described hereinabove when molding a preform that is a premolded body for blow molding a synthetic resin container, molding a spout that is a discharge port of the container, or molding a cap. In this case, accurately feeding and placing a molten resin prior to compression molding to the desired position inside the mold is a necessary condition for obtaining a good molded article. The problem is that the occurrence of displacement, oblique placing, or falling delay causes molding defects. In particular, in the case of a multilayer molten resin that imparts a molded product with high functionality, if the molten resin is fed into a mold in an eccentric or tilted state and the compression molding is performed in this state, then the intermediate layers will shift to one side or the layers will be ruptured, causing molding defects. For example, when a molded article is obtained in which a multilayer resin comprises a gas barrier resin layer inside thereof, the gas barrier layer can be exposed to the outside or can be locally thinned or ruptured, whereby the gas barrier function will be lost.

A conventional molding apparatus has been suggested (see Patent Document 1) in which a molten resin is extruded with an extruder, fed to a mold, and compression molded to obtain a compression molded product, this molding apparatus having a route by which the molten resin is supplied from a mold of the extruder to be placed into a mold of a compression molding machine, wherein the mold of the compression molding machine is located or passes directly below the die head of the extruder, an annular molten resin extruded from the die head is received by the surface of an intermediate support member that extends from the mold of the compression molding machine and has an extending rod that can slide in the axial central section, and the molten resin is placed on the female mold by pushing down a molding plunger (male mold). In a suggested molding apparatus of another configuration (see Patent Document 2), a die head of an extruder for a molten resin and a mold of a compression molding machine are disposed so that the axial lines thereof are shifted from each other, a rotary disk is provided that has a cutting-holding mechanisms disposed with a predetermined pitch on the outer peripheral section thereof, this mechanism conveying the molten resin between the die head of the extruder and the mold of the molding machine, the cutting-holding mechanism conveys the molted resin to directly above the mold by the rotation of the rotary disk, and molten resin guiding means is provided so that it can be inserted between a female mold and a male mold and removed therefrom.

Patent Document 1: Japanese Publication of Examined Application No. 07-61656

Patent Document 2: Japanese Publication of Patent Application No. 2000-280248

DISCLOSURE OF THE INVENTION

Problem to be Solved by the Invention

As described hereinabove, a plurality of members (these members, including the female mold, will be generally referred to hereinbelow as route members) are positioned for conveying or aligning and guiding the molten resin that was extruded from the die head of the extruder and cut to the predetermined length are disposed in a route leading to the female mold. Because the molten resin has an adhesive ability, the molten resin easily sticks or adheres (referred to hereinbelow simply as "adhesion") to these members when it is brought into contact therewith. The resultant problems are as follows: the molten resin adheres to the route members before the molten resin is seated on the bottom of the female mold, a free fall of the molten resin is inhibited, the molten resin is seated in a tilted state, the falling timing thereof is changed, the timing with the mold in which high-speed molding is performed is changed, or the molten resin sticks permanently to the route members and does not reach the female mold, causing molding defects, and the like. It is especially important to ensure accurate seating of the molten resin inside the mold in the contemporary high-speed molding machines and in the manufacture of multilayer resin molded articles.

Accordingly, it is an object of the present invention to provide a method for feeding a molten resin that can reliably prevent a molten resin from adhering to route members that are positioned in the route thereof when the molten resin is fed into a mold, increase the alignment accuracy of the molten resin inside the mold, ensure the accurate feed of the molten resin without a delay of feed timing or the like, and obtain good molded articles, and also to provide a device for implementing such a method, and a method for manufacturing a molded article from the molted resin that has been thus fed.

Means for Solving Problem

A method for feeding a molten resin in accordance with the present invention that resolves the above-described problems is a method for feeding a molten resin by which a molten resin is fed to a molding apparatus, wherein a route member, positioned in a route through which the molten resin passes prior to molding, is subjected to a molten resin adhesion preventing action by a molten resin adhesion preventing means, whereby the molten resin is fed to the molding apparatus, while being prevented from adhering to the route member.

Imparting vibrations to the route member or forming an air layer on a surface of the route member can be advantageously employed as the molten resin adhesion preventing means. A method by which the air layer is formed by directly feeding the air to the surface of the route member that faces the molten resin, and a method by which the air layer is formed by forming the route member as a porous body and feeding the air into the route member, and ejecting the air from the surface thereof can be employed.

Any member from amongst a rod-shaped guide member that passes through and guides the cylindrical molten resin extruded from an extruder, a throat member that guides the molten resin that is extruded from an extruder and cut to the fixed length into a female mold, a resin conveying member that receives the molten resin extruded from the extruder, cuts the molten resin to a predetermined length, and conveys the molten resin to a position above a female mold, and a female mold for compression molding, or all these members are preferred as the route members to be imparted with a molten resin adhesion preventing action with the molten resin adhesion preventing means.

A device for feeding a molten resin in accordance with the present invention that resolves the above-described problems is a device for feeding a molten resin that feeds a molten resin to a molding apparatus, the device comprising molten resin adhesion preventing means for preventing the molten resin from adhering to a route member positioned in a route through which the molten resin passes prior to molding.

The molten resin adhesion preventing means can be configured of vibration imparting means for imparting vibrations to the route member. Further, the molten resin adhesion preventing means can comprise means for feeding the air into the route member and means for ejecting the air that has been fed into the route member onto a surface on the side facing the molten resin, and the ejection of the air from the inside can form an air layer on the surface on the side of the route member that faces the molten resin. The molten resin adhesion preventing means can comprise means for forming an air flow that flows along a surface of the route member that faces the molten resin, and the air layer can be formed on the surface of the route member by the air flow. Furthermore, the route member employing the molten resin adhesion preventing means is any from amongst a rod-shaped guide member that passes through and guides the cylindrical molten resin extruded from an extruder, a throat member that guides the molten resin that is extruded from an extruder and cut to the fixed length into a female mold, a female mold for compression molding, and a resin conveying member that receives the molten resin extruded from the extruder, cuts the molten resin to a predetermined length, and conveys the molten resin to a position above a female mold.

Furthermore, in a method for manufacturing a molded article in accordance with the present invention, a molten resin is fed to a mold by any method of the methods described in claims 1 to 8 and the molded article is manufactured by compression molding the molten resin. This manufacturing method can be advantageously applied to manufacturing a spout member of a container, a preform for a container, and a container lid.

Effect of the Invention

With the method and device for feeding a molten resin in accordance with the present invention, sliding properties of the molten resin that is fed into a mold are improved and the molten resin can be reliably prevented from adhering to route members positioned in the feed route of the molten resin by imparting a molten resin adhesion preventing action such as vibrations or air layer formation with the molten resin adhesion preventing means to the route members present within the route from the die head to a position where the molten resin is seated in the mold. As a result, the molten resin can be fed accurately with a stable passage time and without a feed timing delay, alignment accuracy of the molten resin inside the mold can be increased, the posture of the molten resin inside the cavity can be stabilized, deformation of the molten resin can be reduced, the shape thereof can be stabilized, and good molded articles can be obtained with good efficiency. As a result, the time required to feed the molten resin into the mold can be shortened and the productivity can be increased. Furthermore, the molded articles obtained by compression molding using the above-described feeding method and feeding apparatus have a uniform thickness of resin, and in the case of multilayer resins, a fixed layer thickness can be ensured with good stability and good compression molded articles can be obtained.

BRIEF DESCRIPTION OF THE DRAWINGS

FIGS. 3A to 3D is a general cross-sectional view of a compression molding apparatus for each step of a process for feeding a molten resin into the mold shown in FIG. 2 by a method for feeding a molten resin that is an embodiment of the present invention.

FIG. 5A is a general cross-sectional view illustrating the state in which the feed of a molding resin is started to a compression molding apparatus of another embodiment of the present invention, FIG. 5B is a general cross-sectional view illustrating a state in which the molten resin is seated in a female mold.

FIG. 6A is a general cross-sectional view illustrating the state in which the feed of a molding resin is started to a compression molding apparatus of another embodiment of the present invention, FIG. 6B is a general cross-sectional view illustrating a state in which the molten resin is seated in a female mold.

FIG. 8A is a cross-sectional view illustrating a feed state of the molten resin from the die head, FIGS. 8B to 8D are plan views illustrating the states in which the molten resin is held, FIG. 8E is a cross-sectional view illustrating the state in which the molten resin is held.

Figure 1:
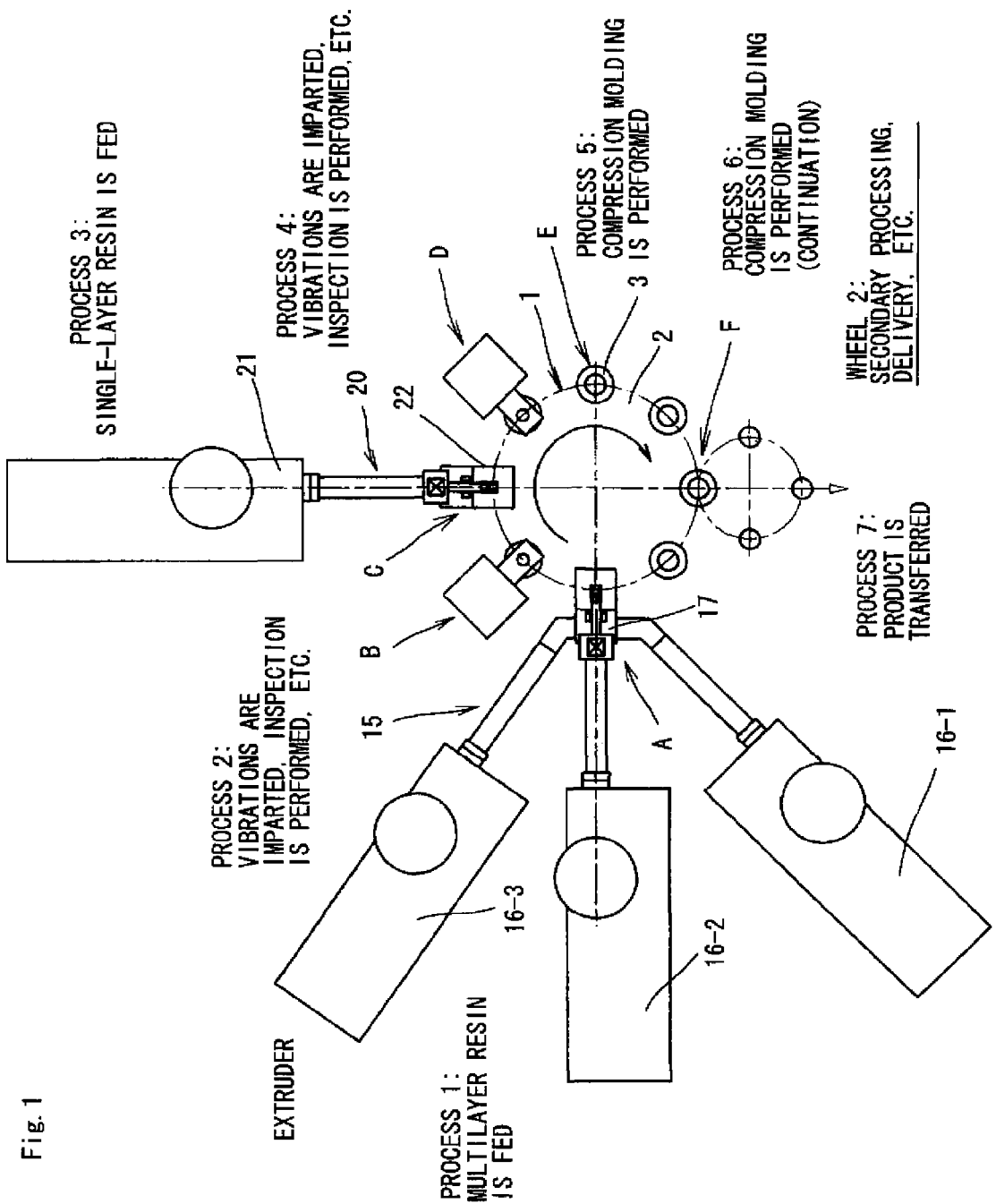
FIG. 1 is a schematic plan view illustrating an arrangement of the first embodiment of the molding apparatus employing the method and device for feeding a molten resin in accordance with the present invention.

EXPLANATION OF LETTERS OR NUMERALS 1 compression molding apparatus
2 turret
3 mold
6 hollow support rod
7, 63 female mold
10, 40, 50 molten resin guide pin
11 base portion
12 spring
15 multilayer molten resin extrusion device
17, 60 die head
20 single-layer molten resin extrusion device
25 molten resin
27 vibration imparting apparatus
28, 73 vibrator
30 air feed nozzle
31, 44 nozzle insertion port
32, 89 air chamber
41 air passage
42 air blow-out port
45 air feed tube
46 air feed nozzle
61 resin conveying member
62, 70, 85 throat member
64 cavity
65 body
66 clamp piece
67 actuator
71 throat portion
74 annular groove
75 air pool
76, 90 compressed air feed port
81, 87 throat member body
82, 92 ultrasonic oscillator
86 throat portion
88 sleeve

DESCRIPTION OF THE PREFERRED EMBODIMENTS

An embodiment of the present invention will be described in greater detail with reference to the appended drawings.

FIG. 1 is a schematic plan view illustrating an embodiment of a molding device that employs the method and device for feeding a molten resin in accordance with the present invention. This embodiment illustrates the case in which a spout having a multilayer structure is formed from a molten resin that is a combination of a single-layer molten resin and a multilayer molten resin extruded from a mold of an extruder.

In FIG. 1, the reference numeral 1 stands for a compression molding machine. In the present embodiment, this is a rotary-type compression molding machine in which a plurality of molds 3 are disposed with a predetermined pitch on the outer periphery of a turret 2. As the turret 2 rotates, each mold 3 successively passes by a multilayer molten resin feed station A, a first vibration imparting station B, a single-layer molten resin feed station C, a second vibration imparting station D, a compression molding station E, and a secondary processing transfer station F, wherein a spout having a multilayer structure is formed via a multilayer molten resin feed process, a first vibration imparting process, a single-layer molten resin feed process, a second vibration imparting process, a compression molding process, and a secondary processing transfer process in respective stations. However, the molded article in the below-described embodiments is not limited to the spout, a variety of molded articles can be molded, and the processes used for molding are not limited to the above-described processes. Furthermore, even if the parts of the same shape are molded, the molten resin feed processes are different in the cases where the part is molded only from a single-layer molten resin, only a multilayer molten resin, and a combination of a multilayer molten resin and a single-layer molten resin, as in the above-described embodiment. For example, when a part is molded only from a single-layer molten resin or a multilayer molten resin, only one resin feed process is sufficient, and the second vibration imparting process becomes also unnecessary.

Figure 2:
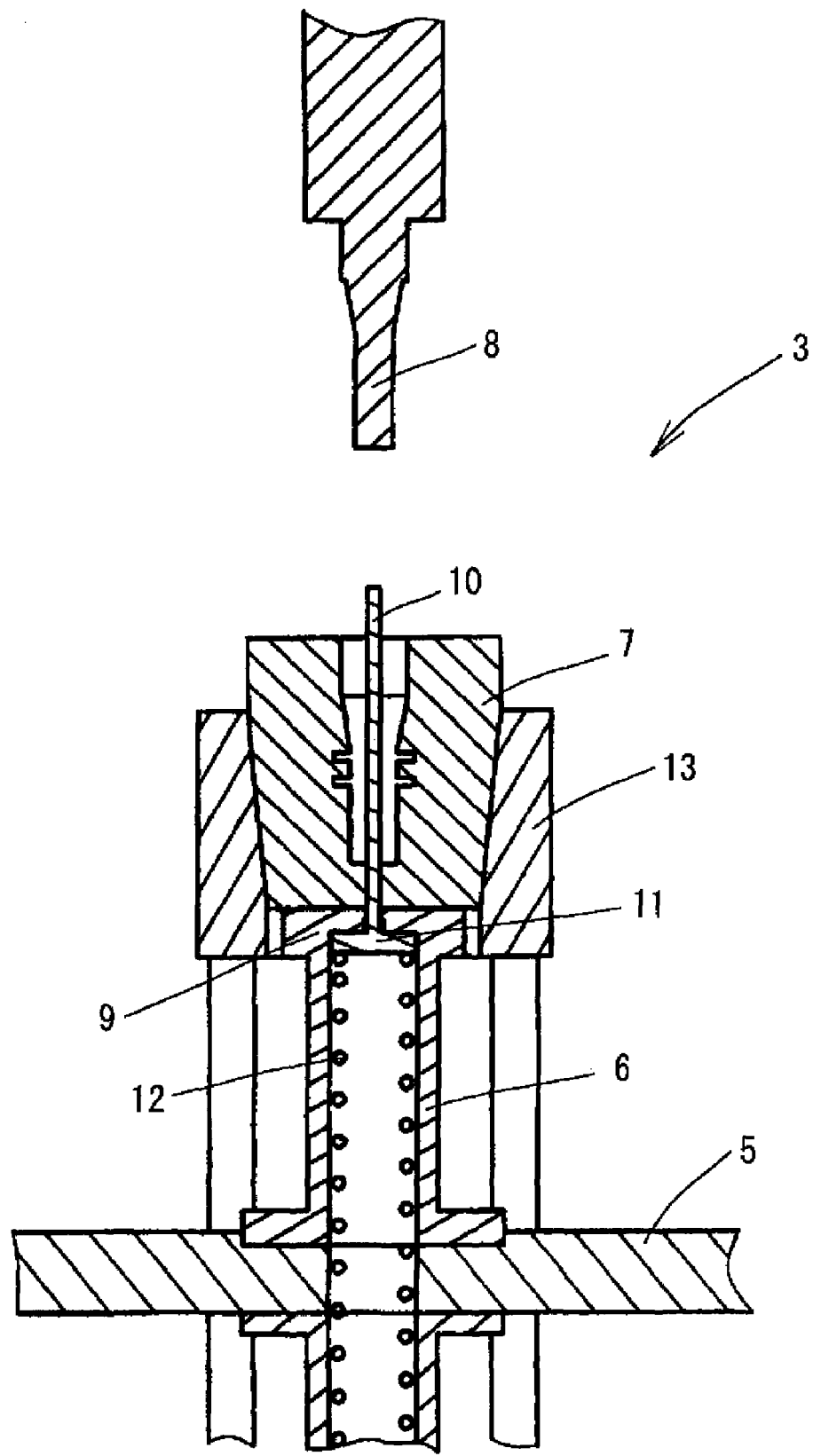
FIG. 2 is a schematic cross-sectional view illustrating a mold for compression molding that employs the present invention.

FIG. 2 shows a schematic cross-sectional structure of the mold 3 for compression molding of the present embodiment. As shown in the figure, the mold is an assembly of a female mold (cavity mold) 7 that is supported at the upper end section of a hollow support rod 6 that is supported at a turret body 5 and a male mold (core mold) 8 disposed opposite the female mold so that the male mold is free to move in the up-down direction. A molten resin guide pin 10 that extends along a central axis inside the cavity of the female core and passes through an upper end wall 9 of the hollow support rod 6 is provided inside the hollow support rod so that the molten resin guide pin can move in the axial direction. The molten resin guide pin 10 is a rod-shaped guide member constituting a route member. A spring 12 is provided between a base portion 11 of the molten resin guide pin and a lower section of the support rod 6, and a predetermined spring force is applied to the molten resin guide pin 10 so that the pin protrudes into the cavity. The molten resin guide pin 10 guides the annular molten resin that was extruded from the die head so that the molten resin is accurately seated on the female mold. The molten resin descends along the molten resin guide pin, whereby the resin is aligned and accurately and concentrically placed inside the cavity. The reference numeral 13 stands for a mold lock mechanism that restricts an outer peripherally section of the female mold configured of split mold, so that the female mold does not open during compression molding. In the present embodiment, the mold lock mechanism is provided so that it can be shifted between a position in which the mold (female mold) is restricted to a position in which it is released by an appropriate lifting means (not shown in the figures). The mold 3 is changed according to the shape and type of the molded article and no specific limitation is placed on the structure of the mold. A well-known mold can be appropriately employed, and the present embodiment is applied to the case in which the mold has a molten resin guide pin that passes through the female mold.

In a multilayer molten resin feed station A, a multilayer resin extrusion device 15 is disposed as shown in FIG. 1. In the embodiment shown in the figure, the multilayer resin extrusion device 15 comprises three resin feeders 16-1, 16-2, 16-3, and three layered resin are laminated in the radial direction and annularly extruded in a molten state from the die head 17. Further, a single-layer molten resin extrusion device 20 disposed in a single-layer molten resin feed station C comprises one resin feeder 21 and a single-layer die head 22, such that the resin fed from the single resin feeder 21 is extruded from the die head 22 and the single-layer molten resin is fed on the multilayer molten resin. Further, in the present embodiment, the multilayer molten resin feed station A and the single-layer resin feed station C are provided separately, but the molten resin feed stations and the below-described vibration imparting station may be provided in one location, provided that the multilayer molten resin and the single-layer molten resin are continuously extruded with a single extrusion device for example, as has been earlier suggested by the applicant (Japanese Publication of Patent Application No. 2004-314336).

In the molding apparatus having the above-described configuration, the route members positioned in a route through which the molten resin extruded from the die head of the extrusion device moves till the resin is seated on the female mold include the molten resin guide pin 10 and the inner peripheral surface of the female mold from the inlet port of the female mold to the zone where the molten resin is seated on the bottom portion. Therefore, provided that the resin does not adhere to these route members and is not affected thereby, the resin can seat accurately inside the female mold. For this reason, in the present embodiment, in order to prevent the molten resin from adhering to the molten resin guide pin 10, a first vibration imparting station B and a second vibration imparting station D are installed and the molten resin guide pin is provided with the following means.

Vibration imparting means that cause the molten resin guide pin 10 to vibrate are provided in the first vibration imparting station B and the second vibration imparting station D in order to prevent the molten resin from adhering to the route members located in the path thereof, in particular the molten resin guide pin 10, thereby ensuring a smooth fall of the molten resin, preventing the molten resin from falling obliquely or sticking to the route members, and shortening the fall time. The vibration imparting means are the most important specific features of the present embodiment. Because the vibration imparting means disposed in the first vibration imparting station B and the second vibration imparting station D can have the same structure, only the vibration imparting device disposed in the first vibration imparting station B will be explained below.

A vibration imparting device 27 that imparts vibrations to the molten resin guide pin 10 comprises a vibrator 28 protruding downward so that it can move in the vertical direction, as shown in FIGS. 3C to 3D, and is so configured that by hitting the head section of the molten resin guide pin 10 with the vibrator at the predetermined frequency by means of an appropriate vibration generator, such as an ultrasound generator, the molten resin guide pin 10 is subjected to micro-vibrations by an elastic action of the spring 12. As a result, the molten resin is prevented from adhering to the molten resin guide pin 10, and the molten resin 25 can be accurately and smoothly, without inclination, seated on the central section of the female mold.

FIGS. 3A to 3D is a process diagram illustrating how a molten resin is fed into the female mold by employing the molten resin prevention means of the above-described configuration. FIGS. 3A to 3B illustrate a state in which the molten resin 25 is fed from the die head 17 in the multilayer molten resin feed station A, while being fitted into the molten resin guide pin 10, and FIG. 3B illustrates a state in which the molten resin is cut and the process of feeding the resin from the die head is completed. FIGS. 3C to 3D illustrate a vibration imparting process in the first vibration imparting station B. In the multilayer molten resin feed station A, the annular molten resin 25 that was extruded from the die head 17 is cut to the predetermined length and fed into the molten resin guide pin 10 that protrudes into the central portion of the female mold [FIGS. 3A to 3B]. Once the first vibration imparting station B is reached, the vibration imparting device is lowered and the vibrator 28 that oscillates at a predetermined frequency is brought into contact with the top section of the molten resin guide pin and the guide pin is subjected to micro-vibrations. As a result, the molten resin 25 is prevented from adhering to the molten resin guide pin. Furthermore, the molten resin 25 falls smoothly along the molten resin guide pin and is accurately seated on the predetermined position of the female mold [FIG. 3D]. The mold 3 is then moved to the single-layer molten resin feed station C, a single-layer molten resin is fed, and vibrations are applied to the molten resin guide pin in the second vibration imparting station D in the same manner as described above. As a result, the single-layer molten resin smoothly falls down and assumes a state in which it is placed over the multilayer molten resin 25. By feeding the molten resins into the female mold in the above-described manner, the molten resin can be accurately positioned and seated inside the female mold and accurately compression molded in the compression station.

Figures 4A, 4B:
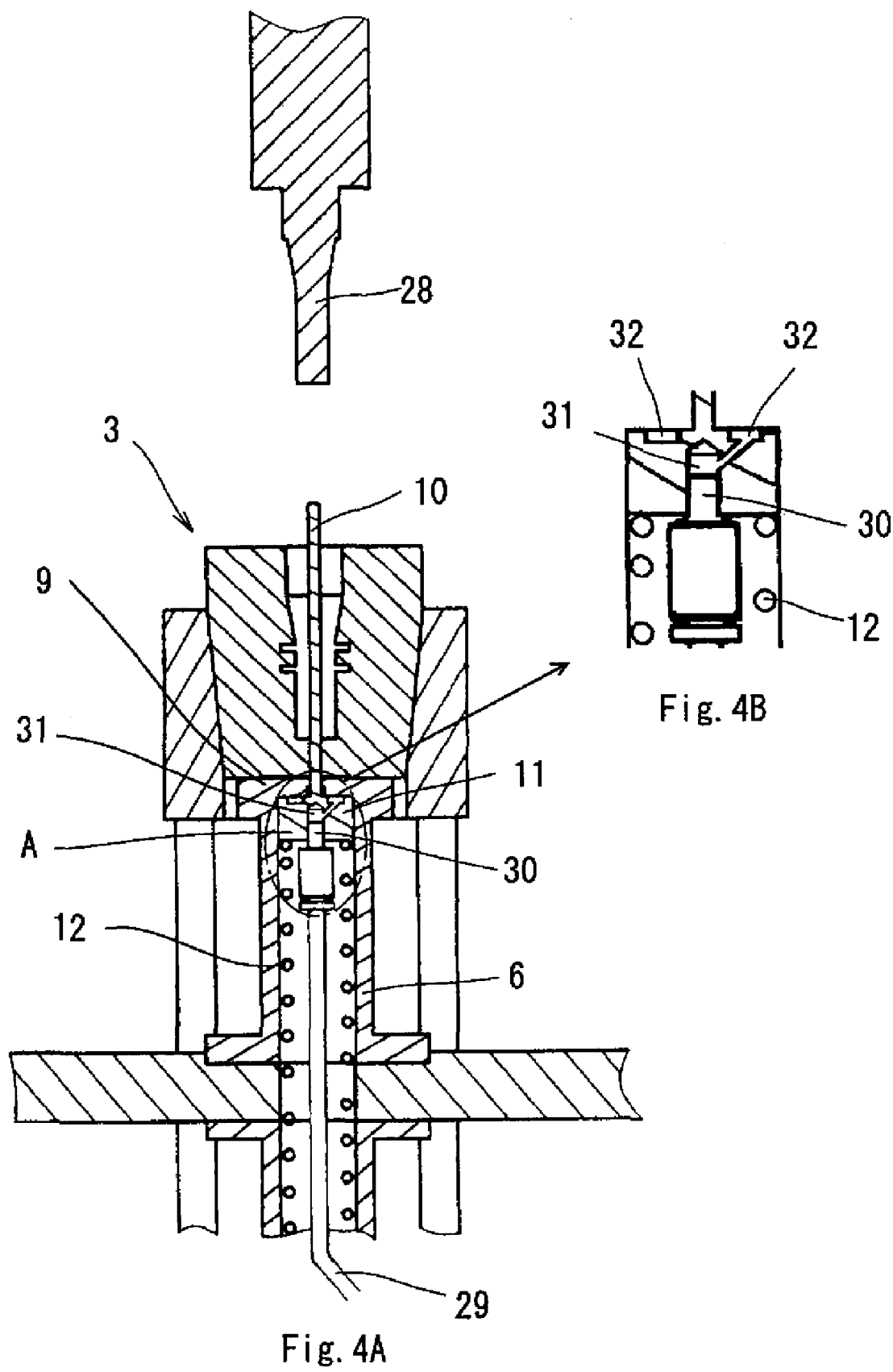
FIG. 4A is a general cross-sectional view of a compression molding apparatus of another embodiment of the present invention.
FIG. 4B is an enlarged view of the A portion.

FIGS. 4A to 4B shows another embodiment of the vibration imparting means for imparting vibrations to the molten resin guide pin 10. In each of the below-described embodiments, only the parts that differ from those of the first embodiment will be explained, and the identical parts will be assigned with identical reference symbols and the explanation thereof will be omitted.

The present embodiment relates to the structure in which the molten resin guide pin 10 is subjected to micro-vibrations by air. FIG. 4B shows the main components on an enlarged scale. As shown in the figure, an insertion port 31 for fitting an air feed nozzle 30 provided at the distal end portion of an air feed tube 29 is provided in a base portion 11 of the molten resin guide pin 10 fitted into the central portion of the hollow support rod 6 of each mold, the insertion port 31 is linked to an air chamber 32 formed in the upper surface of the base portion 11 opposite the upper end wall 9 of the hollow support rod, and air is continuously or intermittently fed from the air feed nozzle 30 into the air chamber 32, whereby the base portion 11 is caused to oscillate by a piston action under the effect of the air pressure and elastic pressure of the spring 12, and the molten resin guide pin 10 micro-oscillates up and down according to the dynamic relationship between the air pressure and the elastic force. As a result, the molten resin that was fed from the die head so as to mate with the molten resin guide pin 10 is prevented from adhering to the molten resin guide pin 10, smoothly falls down to the predetermined position of the female mold, and can be accurately seated therein, without displacement. In the present embodiment, because the vibration imparting means of the molten resin guide pin 10 is provided in each mold and moves integrally with the mold, vibrations can be provided as the mold moves and the special vibration imparting station B of the above-described embodiments is unnecessary. Therefore, the interval from the time at which the molten resin is fed to the start of the compression molding process can be shortened.

FIG. 5 illustrates yet another embodiment of the present invention.

In the present embodiment, an air layer is formed, instead of the above-described vibration imparting means, on the surface of the molten resin guide pin as means for preventing the adhesion of molten resin, and this layer prevents the molten resin from adhering to the surface of the molten resin guide pin. As shown on an enlarged scale in FIG. 5, an air passage 41 is formed along the axial line in a molten resin guide pin 40, a large number of air blow-out holes 42 extending from the air passage to the outer peripheral surface of the molten resin guide pin are formed so as to be almost uniformly distributed at the outer peripheral surface, a nozzle insertion port 44 linked to the air passage 41 is formed in a base portion 43 of the molten resin guide pin, and an air feed nozzle 46 of the air feed pipe 45 is inserted into the insertion port 44. By employing the molten resin guide pin of the above-described configuration, the air is blown out and air layer is formed on the outer peripheral surface of the molten resin guide pin. Therefore, the molten resin is prevented from adhering to the molten resin guide pin, smoothly falls down under the air bearing action, and can be accurately seated.

In the embodiment shown in FIGS. 5A and 5B, the molten resin guide pin 40 is formed by the usual metal member and a large number of air blow-out holes linked to an air passage of the central portion are formed in the outer peripheral portion of the metal member, but by forming the molten resin guide pin from a porous material, a uniform air layer can be formed from the outer peripheral portion of the molten resin guide pin, without forming the above-described air blow-out holes, and the molten resin guide pin can be easily manufactured.

FIGS. 6A to 6B illustrates yet another embodiment in which an air layer is formed as the molten resin adhesion preventing means on the surface of the molten resin guide pin. Similarly to the embodiment illustrated by FIGS. 5A to 5B, process components equivalent to the embodiment shown in FIGS. 4A to 4B are shown on an enlarged scale.

In the present embodiment, means for forming the air layer on the surface of a molten resin guide pin 50 is configured so that the air is blown out from the base portion toward the upper portion of the molten resin guide pin along the outer peripheral surface. Thus, in the present embodiment, as shown on an enlarged scale in FIGS. 6A and 6B, the configuration is such that the compressed air is fed into a hollow portion 51 of a hollow support rod 6, this air passes by an outer peripheral portion of a base portion 52 of a molten resin guide pin 50 that is fitted into the hollow portion, passes along an upper end wall 9 and a bottom wall of the female mold and is discharged upward so as to envelope the outer peripheral portion of the molten resin guide pin or the bottom portion inside the cavity. With such a configuration, the air is ejected in the above-described manner at least from the time at which the resin feed from the die head is started to the time at which the resin is seated inside the female mold. As a result, an air layer is formed on the outer peripheral portion of the molten resin guide pin, and the molten resin is prevented from adhering to the molten resin guide pin and can be accurately and smoothly seated inside the female mold.

The above-described embodiment relates to the case in which a molten resin guide pin is provided that moves up and down inside a female mold and a molded article of a cylindrical shape is manufactured. However, in the case where a molded article having no hollow portion passing therethrough in the vertical direction, such as a cap, is molded, the molten resin does not assume an annular shape and, therefore, a configuration having the molten resin guide pin cannot be applied. In this case, a throat member that can be inserted between a female mold and a male mold and removed therefrom is often provided as a guide means for the molten resin, instead of the molten resin guide pin. Therefore, in this case, the route members from the die head to the seating location include the throat member and the female mold. Furthermore, in this case, the die head and the seat center position of the mold are often disposed with a shift with respect to each other and the configuration often has a molten resin conveying member such that the molten resin fed from the die head is received by a resin conveying member 61, cut to the predetermined length, and conveyed to a location above the conveying route of the female mold. Therefore, in this case, the molten resin conveying member is added as a route member. In the below-described embodiment, the molten resin adhesion preventing action is provided with a molten resin adhesion preventing means with the object of preventing the molten resin from adhering to these route members.

Figure 7:
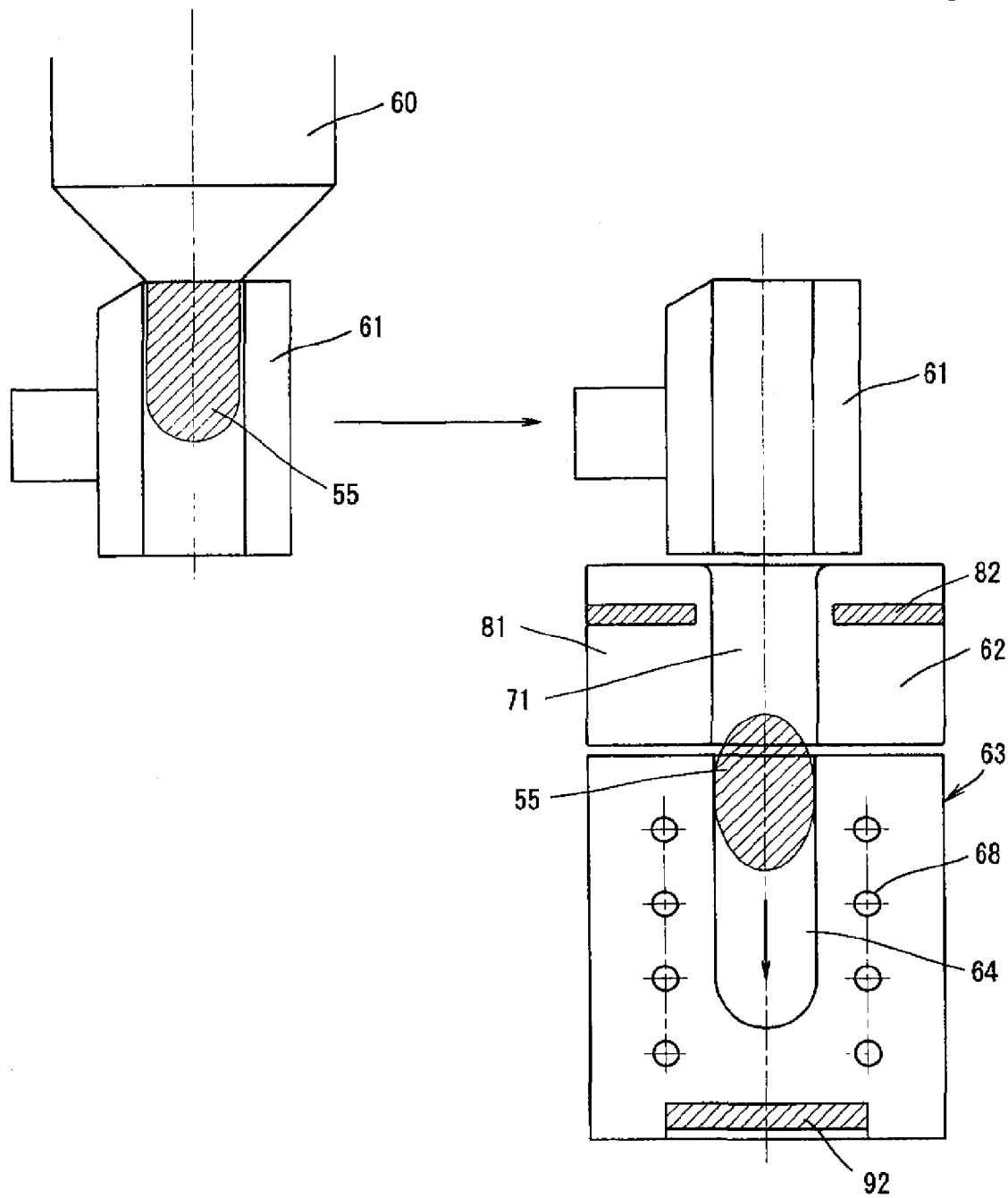
FIG. 7 is a general cross-sectional view of route members illustrating a method for feeding a molten resin to a molding apparatus that is another embodiment of the present invention.
Figure 8A:
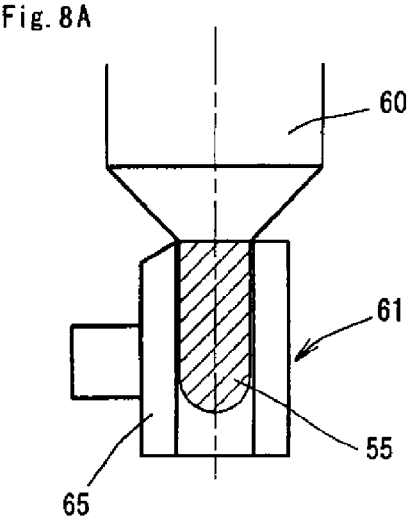
FIGS. 8A to 8E is an explanatory drawing illustrating an operation state of a resin conveying member.
Figure 8B:
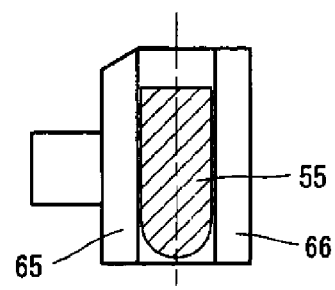
Figure 8C:
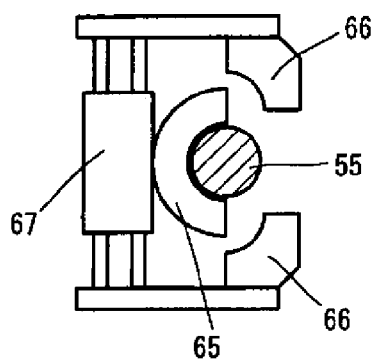
Figure 8D:
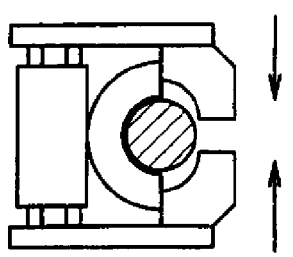
Figure 8E:
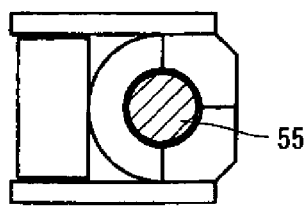

FIG. 7 is a schematic diagram illustrating an embodiment in which the axes of the die head and mold are shifted with respect to each other. In the figure, the reference numeral 60 stands for a die head, 61 stands for a resin conveying member that receives a molten resin from the die head, cuts the molten resin to the predetermined length, and conveys the molten resin on the movement route of the mold, 62 stands for a throat member that is removably provided above the movement route of the female mold, and 63 stands for a female mold. A plurality of the resin conveying members 61 are disposed with a predetermined spacing, for example, at a rotary turret (not shown in the figures) and are intermittently driven and moved so as to pass below the die head 60 and above the throat member 62. As shown in FIGS. 8A to 8E, the resin conveying member 61 comprises a body 65 having clamping surfaces of an almost semi-cylindrical shape for clamping and holding the molten resin that extrude perpendicularly from the die head and a pair of clamp pieces 66 that can open and close and serve as almost quarter-cylindrical clamping surfaces that face the semi-cylindrical clamping surfaces. The clamp piece 66 is opened and closed, as shown in FIGS. 8B, 8C and 8E, via an appropriate actuator 67 such as a cylinder device provided at the body 65. The molten resin is received in a state in which the clamp pieces 66 are open, and the molten resin is held by closing the clamp pieces. When a molten resin cutting means for cutting the molten resin extruded from the die head 60 to the predetermined length is not provided, a cutter for cutting the molten resin is integrally provided on the upper surface of the resin conveying member 61 (such a configuration is not shown in the figures).

In the present embodiment, in the resin conveying member 61 of the above-described configuration, a molten resin adhesion preventing means is applied to the clamp pieces 66 in order to prevent the molten resin from adhering to the clamps and the drop posture of the molten resin is prevented from collapsing when the resin conveying member 61 receives the molten resin, moves, reaches a position directly above the throat member 62 and drops the molten resin held thereby onto the throat member.

As the molten resin adhesion preventing means, in the present embodiment, at least a pair of the clamp pieces 66, 66 are configured so that they can be vibrated by an appropriate vibration generating means such as a piezoelectric element (not shown in the figure), and by causing the vibrations of the clamp pieces when the clamp pieces are moved to a position above the throat member 62 and opened, whereby the molten resin is prevented from sticking to the clamp pieces and the posture of the molten resin is prevented from collapsing, and the molten resin falls into a throat 71 of the throat member in a correct posture. It would be even more effective to provide a vibration generation means at the body 65 having the semi-cylindrical clamping surfaces, rather than only on the clamp pieces, and simultaneously cause the vibrations of the body when the molten resin falls in.

In the above-described embodiment, at least a pair of claim pieces 66, 66 could be vibrated, but instead of using the vibration generation means, an air layer can be formed on the clamping surfaces of the clamp pieces for the molten resin in order to prevent the molten resin from adhering to the clamp pieces. For this purpose, the clamp pieces themselves are formed from a porous material and compressed air is fed into the clamp pieces, whereby the air is blown out from the inner surface onto the entire clamping surface and the air layer is formed. With the configuration in which the feed of the air into the clamp pieces can be appropriately controlled, the air can be fed only when the molten resin is separated, without forming the air layer when the molten resin is held. In the present embodiment, not only the clamp pieces, but also the body 65 may be formed from a porous material to form the air layer on the clamping surfaces.

Further, if necessary, the molten resin adhesion preventing means can be also provided at the throat member 62 and female mold 63. In the embodiment shown in FIG. 7, a vibration imparting means that causes the throat member 62 and the female mold 63 to vibrate is provided as the molten resin adhesion preventing means also on the throat member 62 and the female mold 63. FIG. 7 shows an embodiment in which an ultrasonic oscillator such as a piezoelectric element is used as the vibration inducing means for the throat member to induce ultrasonic oscillations. In the throat member 62 of the present embodiment, an ultrasonic oscillator 82 comprising a piezoelectric element is appropriately attached to the throat member body 81, the throat member is caused to oscillate ultrasonically by an electrostriction action of the piezoelectric element, and the molten resin 55 is prevented from adhesion.

Further, in the present embodiment, as shown in FIG. 7, the configuration is such that an ultrasonic oscillator 92 such as a piezoelectric element is attached to the appropriate location of the female mold 63 for compression molding, and the female mold is caused to oscillate ultrasonically because of oscillations of the ultrasonic oscillator. By causing the female mold to oscillate before the molten resin 55 is seated on the cavity 64, the molten resin can be prevented from adhering to the female mold in the feeding process before the resin is seated on the female mold and the molten resin can be accurately seated. In the figure, the reference numeral 64 stands for a cavity, and 68 stands for a cooling water passage.

Figure 9:
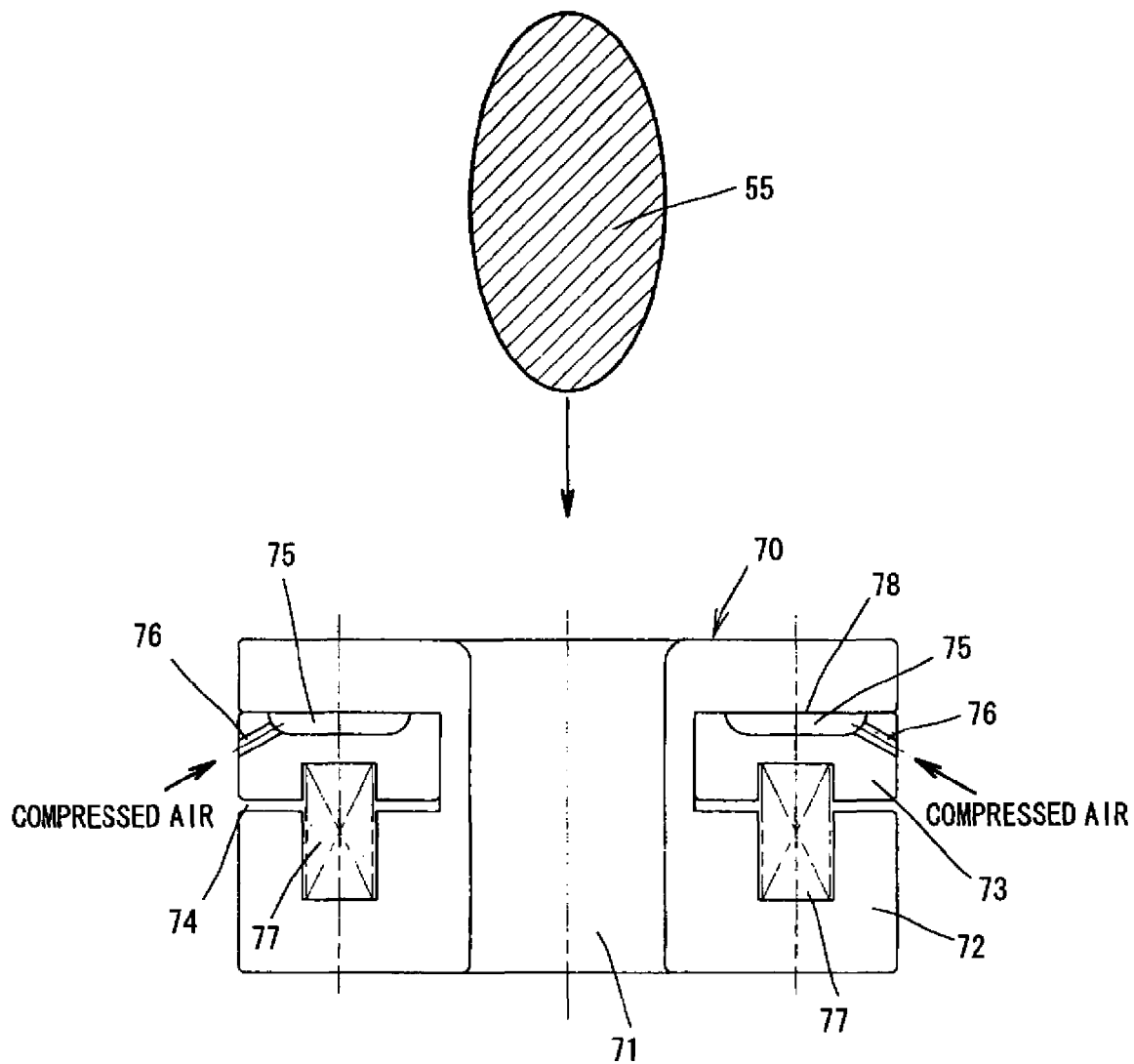
FIG. 9 is a cross-sectional view of a throat portion of the molding apparatus of another embodiment of the present invention.
Figure 10:
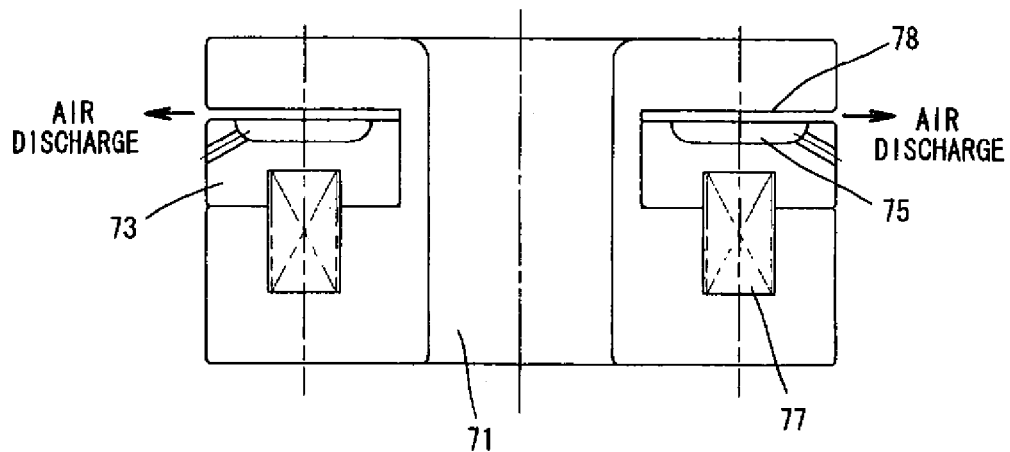
FIG. 10 is a cross-sectional view illustrating the air discharge state of the throat portion.

FIG. 9 and FIG. 10 illustrate an embodiment in which another means is provided at the throat member as means for preventing the molten resin from adhering to the throat member. A throat member 70 of the present embodiment is a combination of a throat member body 72 through which passes a throat 71 that serves to pass a molten resin 55 in the central portion thereof and a ring-shaped vibrator 73. The vibrator 73 is fitted so that it can vibrate up and down in an annular groove 74 formed from the outer peripheral surface of a throat member body 72. The vibrator 73 is formed to be thinner than the width (height in the axial direction) of the annular groove 74, an air pool 75 with an open upper end is formed in the upper surface of the vibrator, a compressed air feed port 76 is formed so that the compressed air can be fed from the outside into the air pool 75, and a compressed air feed pipe (not shown in the figure) is attached to the compressed air feed port 76. A spring 77 is provided between the lower surface of the vibrator 73 and the throat member body 72, and the upper surface of the vibrator 73 is brought into intimate contact with the upper surface of the annular groove 74 and impelled so as to close the opening of the air pool 75. The throat 71 does not necessarily have a cylindrical cross section, and the design can be changed arbitrarily, for example, so that the throat has a funnel-like or a shape corresponding to the cross-sectional shape of the largest portion of the molten resin.

The throat member 70 of the present embodiment has the above-described configuration, and when the compressed air is fed from the state shown in FIG. 9 to the compressed air feed port 76, the internal pressure of the air pool 75 rises and the vibrator 73 is pushed down against the force of the spring 77 and assumes a state shown in FIG. 10. When such a state is assumed, as shown in the figure, the gap between the air pool 75 and the upper wall surface 78 of the annular groove 74 increases, and the compressed air located inside the air pool is released to the outside. As a result, the pressure in the air pool 75 decreases. Accordingly, the vibrator is raised by the repulsion of the spring and again assumes the state shown in FIG. 9. These operations are thereafter repeated, that is, the cycles of increase and decrease in the air pressure in the air pool are repeated, whereby the vibrator is caused to oscillate. As a result, the upper surface of the vibrator repeatedly hits the upper wall surface of the annular groove, the entire throat member 70 oscillates, the molten resin 55 passing through the throat portion 71 is prevented from adhering to the inner peripheral surface of the throat portion, and the molten resin smoothly falls down.

Figure 11:
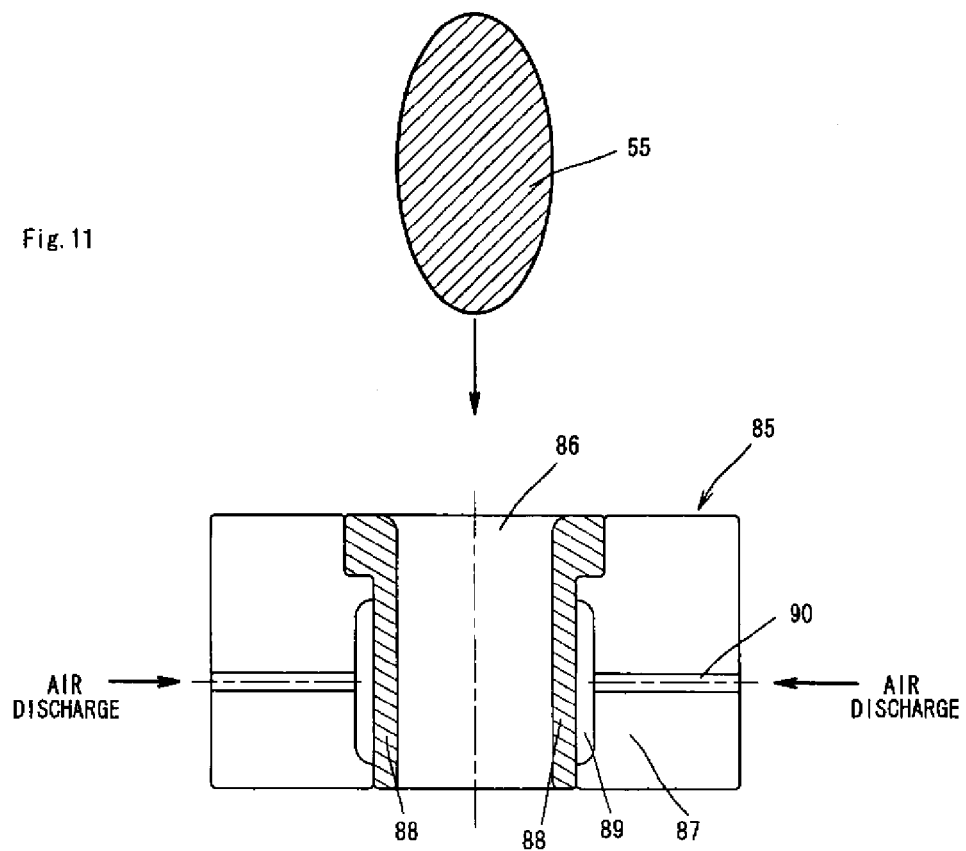
FIG. 11 is a cross-sectional view of a throat portion of the molding apparatus of yet another embodiment of the present invention.

FIG. 11 illustrates an embodiment in which an air layer is formed on the throat surface as means for preventing the molten resin from adhering to the throat member. A throat member 85 of the present embodiment has a throat 86 passing through the central portion thereof, in the same manner as in the above-described embodiment, but the inner peripheral wall surface of the throat is formed by a sleeve 88 made from a porous material. Thus, in the present embodiment, the throat member 85 comprises a throat member body 87 formed from the usual metal material and a sleeve 88 formed from a porous material and tightly mated with the throat member body. The sleeve 88 serves as a throat that guides the molten resin. An air chamber 89 is formed in the tight mating position of the throat member body 87 and the sleeve 88, and a compressed air feed port 90 for feeding the compressed air from the outside is linked to the air chamber 89.

In the throat member 85 of the present embodiment that has the above-described configuration, an air layer is formed by blowing the air from the air chamber 89 onto the inner peripheral surface of the sleeve 88 constituting the throat, and the molten resin that passes through the throat 86 can be effectively caused to fall down into the female mold, without adhering to the throat. By providing the throat member with the above-described means for preventing the molten resin from adhesion, a stable drop of the molten resin can be ensured even if the throat diameter is decreased. For the molten resin to have a good posture in falling, it is desired that the throat diameter be as small as possible with respect to the molten resin diameter, but if the throat diameter is decreased, the molten resin adheres to the throat and cannot fall smoothly. Therefore, the conventional configurations had to have a large throat diameter, but in this case the molten resin could not maintain good posture in falling.

Various embodiments of molten resin adhesion preventing means in the method and device for feeding a molten resin in accordance with the present invention were described above, but these molten resin adhesion preventing means are not necessarily required to be provided on all the route members such as a rod-shaped guide member (molten resin guide pin), a resin conveying member, a throat member, or a female mold, and an appropriate combination of such means may be employed according to the molded article and the like. Further, the molten resin adhesion preventing means are not limited to the above-described embodiments.

The above-described method and device for feeding a molten resin in accordance with the present invention can be applied to manufacturing a variety of molded articles, but it is especially suitable for compression molding the spout members of containers, preforms for containers, or container lids. In particular, when such molded articles having a multilayer structure are manufactured, the molten resin can be compression molded after being accurately seated inside the female mold. Therefore, the displacement of layers and changes in the layer thickness can be prevented and molding can be effectively performed.

EXAMPLES

Example 1

The effect of vibrations on the fall of a molten resin in a device for feeding a molten resin of the embodiment shown in FIG. 2 was studied with respect to the case in which the molten resin guide pin was vibrated (Example) and the case where the guide pin was not vibrated (Comparative Example). The seating state of the molten resin was studied with respect to the case of the Example in which the molten resin was caused to fall down into a female mold, while the vibrations with a frequency of 258 Hz and an amplitude of 1 mm were applied for 0.2 sec to the molten resin guide pin, and the Comparative Example in which the molten resin was caused to fall down into the female mold, without subjecting the molten resin guide pin to vibrations. The test was conducted 50 times. The results demonstrated that in the Example, the molten resin was accurately seated inside the female mold in all the tests and no fall defects were observed. By contrast, in the Comparative Example, the seating state was poor in 25 of 50 tests and fall defects were observed in 50% of cases. The tests have thus confirmed that vibrating the molten resin guide pin is very effective for accurately seating the molten resin.

Example 2

Figure 12C:
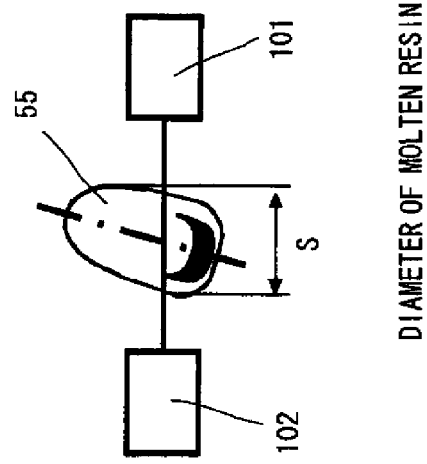
FIGS. 12A to 12C is an explanatory drawing illustrating a method for measuring the passage time and molten resin diameter when the molten resin falls down from the throat portion.
Figure 12B:
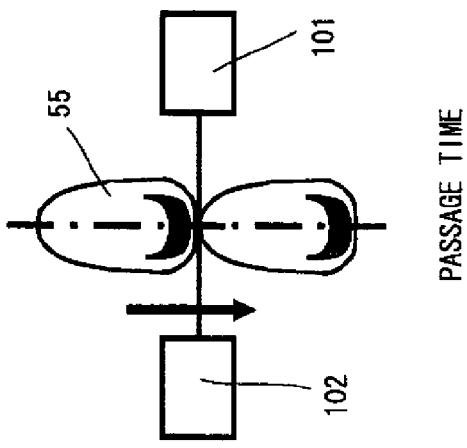
Figure 12A:
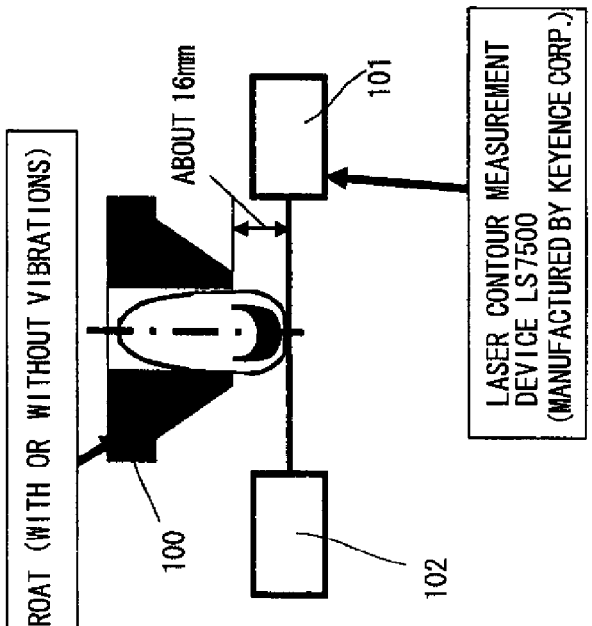
Figure 13:
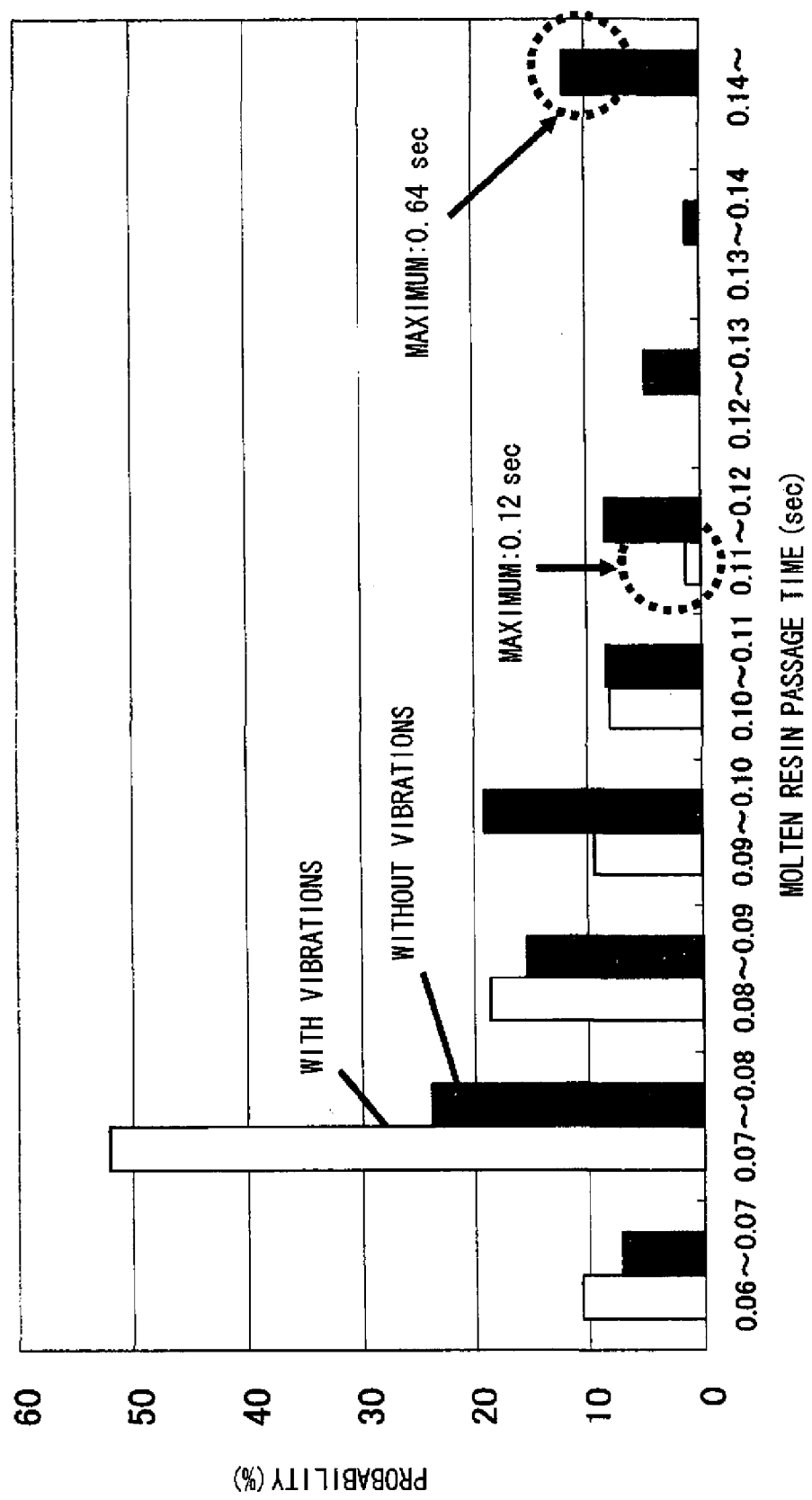
FIG. 13 is a graph illustrating the spread in passage time of the molten resin falling down from the throat portion.

In the configuration shown in FIG. 7 in which a molten resin fell into a female mold via a throat member, the time required for a molten resin to pass from the lower end of a throat member 100 to a position about 16 mm below the lower end was measured, as shown in FIG. 12A, with a laser contour measurement device 101 with respect to the case in which the molten resin was continuously passed 340 times through a throat and the throat member was vibrated (Example) and the case in which the throat member was not vibrated (Comparative Example). In the measurements, the interval from the time at which the distal end of the molten resin crossed a laser beam emitted from a laser generator 102 to the time at which the rear end of the molten resin crossed the beam was measured. A graph shown in FIG. 13 was obtained based on the measurement results. The graph clearly shows that when the throat was vibrated, the interval was within 0.07 to 0.08 sec in 50% or more tests, and the intervals within a range of 0.11 to 0.12 sec in which 0.12 sec was the maximum interval took not more than 2%. It was thus confirmed that the spread was small, the molten resin fell down with almost uniform periods, the passage time was stable, and practically no adhesion of molten resin occurred inside the throat. By contrast, when the throat member was not vibrated, the fall-down time was distributed within a wide range of 0.06 to 0.64 sec and the delay (adhesion) of the molten resin in the throat was observed.

Example 3

Figure 14:
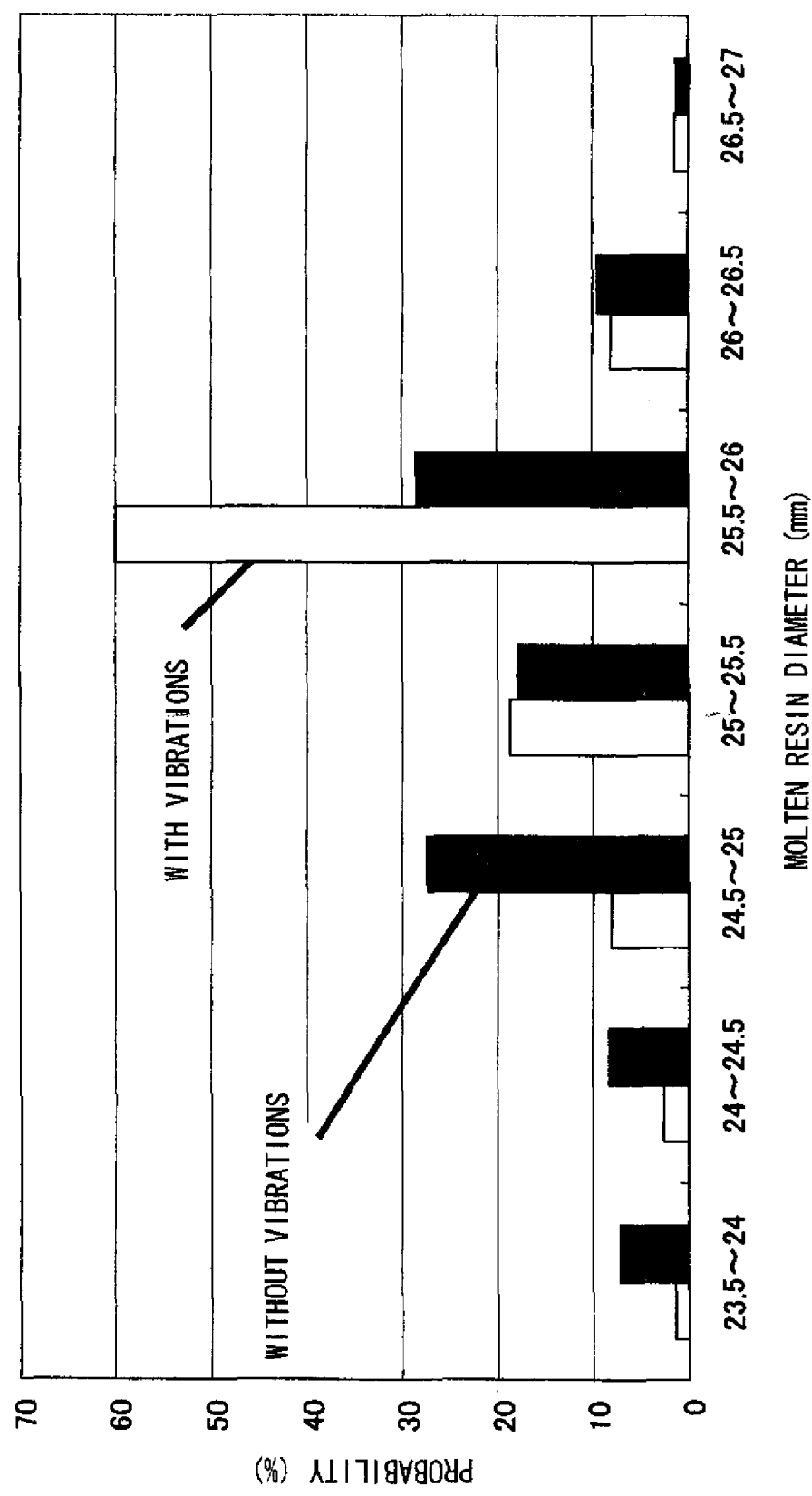
FIG. 14 is a graph illustrating the spread in diameter of the molten resin falling down from the throat portion.

The tilted configuration of the falling molten resin was measured by using the laser contour measurement device identical to that of Example 2 when the throat was vibrated (Example) and not vibrated (Comparative Example). The molten resin apparently meets a certain resistance due to partial adhesion to the throat and falls in a tilted state. As shown in FIG. 12C, when the molten resin is tilted, the maximum interval s increases, but the decreasing maximum interval s is determined to improve the resin posture in falling. Accordingly, the tilted state of the molten resin was measured by measuring the maximum interval s in which the laser beam is crossed. A graph shown in FIG. 14 represents the results obtained. The graph clearly shows that in the Example, almost 60% of the molten resin samples are distributed within a range of maximum diameter of 25.5 to 26 mm, and the molten resin can be confirmed to fall in a comparatively uniform stable state. By contrast, in the Comparative Example, the maximum diameter of the molten resin varied significantly and was unstable.

INDUSTRIAL APPLICABILITY

The present invention can be applied as a method for feeding a molten resin that is suitable for feeding a molten resin to a molding apparatus for molding a variety of molded articles such as preforms, spout members, and container lids, this method making it possible to prevent the molten resin extruded from a die head from adhering to members located in a route to the seating zone of a female mold, to stabilize the molten resin passage time, molten resin diameter, and posture inside the cavity, and to seat the molten resin accurately inside the cavity, whereby even molded articles with a multilayer structure can be molded effectively without a spread in the intermediate resin layers. The present invention can be also applied as an apparatus for feeding a molded resin and as a method for manufacturing a molded article with the molten resin that was thus fed.

The invention claimed is:

1. A method for feeding a molten resin by which a molten resin extruded from a die head is fed to a compression molding apparatus disposed at a distance from the die head, wherein a route member, positioned in a route through which the molten resin passes prior to seating on a mold of the compression molding apparatus, is subjected to a molten resin adhesion preventing action by a molten resin adhesion preventing means, whereby the molten resin is fed to the compression molding apparatus, while being prevented from adhering to the route member, wherein the molten resin adhesion preventing means forms an air layer on a surface of the route member, and wherein the air layer is formed by air ejected from the surface of the route member formed as a porous body.

2. The method for feeding a molten resin according to claim 1, wherein the route member is a rod-shaped guide member that passes through and guides a cylindrical molten resin extruded from an extruder.

3. The method for feeding a molten resin according to claim 1, wherein the route member is a throat member that guides the molten resin that was extruded from an extruder and cut to a fixed size to a female mold.

4. The method for feeding a molten resin according to claim 1, wherein the route member is a resin conveying member that receives a molten resin extruded from an extruder, cuts the molten resin to a predetermined length, and conveys the molten resin to a position above a female mold.

5. A device for feeding a molten resin that feeds a molten resin extruded from a die head to a compression molding apparatus disposed at a distance from the die head, the device comprising molten resin adhesion preventing means imparting a molten resin adhesion preventing action to a route member for preventing the molten resin from adhering to the route member positioned in a route through which the molten resin passes prior to seating on a mold of the compression molding apparatus, wherein the molten resin adhesion preventing means comprises means for feeding air into the route member and means for ejecting the air that has been fed into the route member onto a surface on the side facing the molten resin, and the ejection of the air from the inside forms an air layer on the surface on the side of the route member that faces the molten resin, and wherein the molten resin adhesion preventing means comprises means for forming an air flow that flows along a surface of the route member that faces the molten resin, and an air layer is formed on the surface of the route member by the air flow.

6. The device for feeding a molten resin according to claim 5, wherein the route member is a rod-shaped guide member that passes through and guides a cylindrical molten resin extruded from an extruder.

7. The device for feeding a molten resin according to claim 5, wherein the route member is a throat member for guiding the molten resin that is extruded from an extruder and cut to a fixed size to a female mold.

8. The device for feeding a molten resin according to claim 5, wherein the route member is a female mold for compression molding, and vibrations are imparted to the female mold for compression molding until the molten resin sits on a bottom of the female mold for compression molding.

9. The device for feeding a molten resin according to claim 5, wherein the route member is a resin conveying member that receives the molten resin extruded from the extruder, cuts the molten resin to a predetermined length, and conveys the molten resin to a position above a female mold.

10. A method for manufacturing a molded article, wherein a molten resin is fed to a mold by any of the methods described in claim 5, and the molded article is manufactured by compression molding the molten resin.

11. The method for manufacturing a molded article according to claim 10, wherein the molded article is a spout member of a container.

12. The method for manufacturing a molded article according to claim 10, wherein the molded article is a preform for a container.

13. The method for manufacturing a molded article according to claim 10, wherein the molded article is a container lid.

* * * * *